US011390372B2

(12) United States Patent
Werquin et al.

(10) Patent No.: US 11,390,372 B2
(45) Date of Patent: Jul. 19, 2022

(54) FORCE APPLICATION DEVICE FOR AN AIRCRAFT CONTROL STICK

(71) Applicant: SAFRAN ELECTRONICS & DEFENSE, Boulogne-Billancourt (FR)

(72) Inventors: Mickael Werquin, Boulogne Billancourt (FR); Yannick Attrazic, Boulogne Billancourt (FR); Corentin Leroux, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/416,746

(22) PCT Filed: Dec. 20, 2019

(86) PCT No.: PCT/FR2019/053272
§ 371 (c)(1),
(2) Date: Jun. 21, 2021

(87) PCT Pub. No.: WO2020/128403
PCT Pub. Date: Jun. 25, 2020

(65) Prior Publication Data
US 2022/0073187 A1 Mar. 10, 2022

(30) Foreign Application Priority Data
Dec. 21, 2018 (FR) ...................................... 1873904

(51) Int. Cl.
*B64C 13/04* (2006.01)
*G05G 5/03* (2008.04)
(Continued)

(52) U.S. Cl.
CPC .......... *B64C 13/0421* (2018.01); *B64C 27/56* (2013.01); *G05G 5/03* (2013.01); *G05G 9/047* (2013.01); *G05G 2505/00* (2013.01)

(58) Field of Classification Search
CPC ...... B64C 13/0421; B64C 27/56; G05G 5/03; G05G 9/047; G05G 2009/04748; G05G 2505/00
See application file for complete search history.

(56) References Cited

U.S. PATENT DOCUMENTS

| 5,002,241 A * | 3/1991 | Tizac ..................... G05G 9/047 244/237 |
| 8,511,621 B2 * | 8/2013 | Antraygue ............. G05G 9/047 244/236 |

(Continued)

FOREIGN PATENT DOCUMENTS

| EP | 2631170 A | 8/2013 |
| EP | 3271244 A1 | 1/2018 |

(Continued)

OTHER PUBLICATIONS

French Search Report dated Sep. 17, 2019 by the French Patent Office in French Application No. 1873904.
(Continued)

*Primary Examiner* — Adam D Rogers
(74) *Attorney, Agent, or Firm* — Sughrue Mion, PLLC (57) ABSTRACT

The invention relates to a force application device for an aircraft control stick comprising: —a casing (24), —an electromagnet (22) mounted on the casing (24), —an actuator (30) mounted on the shaft (13), the actuator (30) being mobile in translation in relation to the shaft (13) along the axis (A), the actuator (30) comprising a magnetic material, and —a coupling device comprising an input gear (40) that is mounted so as to be stationary in relation to the casing (24) and an output gear (50) connected to the actuator (30) by means of an attachment part (60), the attachment part (60) being configured so as to allow a limited angular displacement between the output gear (50) and the shaft (13) around
(Continued)

the axis (A) and to allow the actuator (30) of the output gear (50) to translate along the axis (A).

13 Claims, 4 Drawing Sheets

(51) Int. Cl.
*G05G 9/047* (2006.01)
*B64C 27/56* (2006.01)

(56) References Cited

U.S. PATENT DOCUMENTS

| | | | |
|---|---|---|---|
| 9,977,457 B2* | 5/2018 | Gomolko | B64C 13/0421 |
| 2022/0057826 A1* | 2/2022 | Lawniczak | G05G 5/03 |
| 2022/0063794 A1* | 3/2022 | Le Roux | B64C 13/505 |
| 2022/0097826 A1* | 3/2022 | Le Roux | G05G 9/047 |

FOREIGN PATENT DOCUMENTS

| | | | |
|---|---|---|---|
| FR | 3 011 815 A1 | 4/2015 | |
| FR | 3025493 A1 | 3/2016 | |
| WO | 2016/146398 A1 | 9/2016 | |
| WO | WO-2020136356 A1 * | 7/2020 | B64C 13/507 |
| WO | WO-2020136357 A1 * | 7/2020 | G05G 9/047 |
| WO | WO-2020225305 A1 * | 11/2020 | B64C 13/0421 |
| WO | WO-2021079075 A1 * | 4/2021 | B64C 13/345 |

OTHER PUBLICATIONS

International Search Report dated Apr. 17, 2021 in International Application No. PCT/FR2019/053272.
Written Opinion of the International Searching Authority of PCT/FR2019/053272 dated Apr. 17, 2020.

\* cited by examiner

FORCE APPLICATION DEVICE FOR AN AIRCRAFT CONTROL STICK

CROSS-REFERENCE TO RELATED APPLICATIONS

This application is a National Stage of International Application No. PCT/FR2019/053272 filed Dec. 20, 2019, which claims priority under U.S.C. § 119(a) to French Patent Application No. 1873904 filed on Dec. 21, 2018, the entire contents of each of which being herein incorporated by reference in their entireties.

FIELD OF THE INVENTION

The invention relates to piloting devices used by the pilot in an aircraft cockpit, in particular an active stick comprising an integrated force feedback to assist the pilot.

TECHNOLOGICAL BACKGROUND

A piloting device in an aircraft cockpit comprises, in the usual way, a pilot stick with in particular a lever rotatably mounted about an axis called roll axis and an axis called pitch axis, these two axes being orthogonal to each other. Devices of the "joystick" type are most often encountered.

Depending on the position of the lever along these two axes, the piloting device transmits movement commands to piloting members of the aircraft.

On the most recent aircraft models, the command of the motions of the aircraft is electronic and the piloting device integrated into the cockpit can be of the "side-stick" type. The position of the lever along the two roll and pitch axes is measured by sensors and translated into movement commands. The lever is not directly mechanically linked to the movable portions of the aircraft and there is no direct mechanical feedback on the lever.

However, it is desirable for flight safety that the pilot perceives a mechanical feedback at the lever. The cockpit signaling systems may not be sufficient to cause the pilot to react quickly enough to unforeseen events during flight. The piloting feelings are much better if the pilot side-stick integrates a force feedback, also called "haptic feedback".

As such, it has been proposed to equip the side-stick with passive mechanical systems, such as spring systems, or active electromechanical systems.

Furthermore, it has been proposed in document FR 3 011 815 to use an active force feedback device with an electric motor. Typically, in this document, the aircraft flight control device includes a control lever mounted on a platen and linked to a roll axis motor and a pitch axis motor via transmission shafts. The two motors are controlled according to a force law, so as to generate a resistive force opposing the force exerted on the lever (force feedback) when a force threshold is exceeded by the pilot. Such a device proves to be effective to restore the piloting feelings and increase safety. However, in the event of an electrical or mechanical fault at one of the motors or in the event of a failure on the chain for processing the motor control signals, the force feedback can be deleted.

In the field of aeronautics, the requirements in terms of availability of the piloting devices are high. It is therefore not acceptable that the pilot suddenly switches to a pilot mode without force feedback in the event of a fault.

In addition, the active force feedback systems of the state of the art often comprise a significant number of components, in particular the roll and pitch motors, but also clutches, torque limiters, gears, etc. These systems can be expensive, bulky and difficult to integrate into an aircraft cockpit. In addition, the introduction of gears implies a reduction in the dynamic performances of the stick, whose inertia increases, and causes a loss of ergonomics because the pilot feels the torque variations due to the gears.

SUMMARY OF THE INVENTION

There is thus a need for a pilot side-stick integrating a mechanical backup channel, to prevent the rotation of the lever from being completely free in the event of an electrical fault affecting a force feedback motor.

The desired side-stick must not be able to switch, in the event of a failure, in a mode where the pilot can freely pivot the lever without feeling a resistive force.

There is a subsidiary need for a side-stick of lower mass, space requirement and power consumption.

In general, the reliability, the simplicity and the ergonomics of the force feedback devices for the side-stick can be improved.

For that, the invention proposes a force application device for a pilot stick of an aircraft, in which the pilot stick comprises a control lever linked to at least one motor comprising a drive shaft movable in rotation about an axis. The force application device comprises:
 a casing, configured to be fixed relative to the aircraft
 an electromagnet, mounted on the casing,
 an actuator, mounted on the shaft, said actuator being movable in translation relative to the shaft along the axis, the actuator comprising a magnetic material, and
 a coupling device comprising an input mesh mounted fixed relative to the casing and an output mesh linked to the actuator by means of a fastening part, said fastening part being configured so as to allow a limited angular displacement between the output mesh and the shaft about the axis and to authorize the translation of the actuator from the output mesh along the axis.

Some preferred but non-limiting characteristics of the device described above are as follows, taken individually or in combination:
 the fastening part comprises a spring having a torsional stiffness and an axial stiffness, the torsional stiffness being greater than the axial stiffness, preferably at least three times greater.
 the fastening part comprises a flex plate.
 the fastening part is pre-stressed and applies a force on the actuator and on the output mesh, so that when the electromagnet is not supplied, the fastening part exerts a return force on the actuator and on the output mesh in the direction of the input mesh.
 the fastening part further comprises a bushing comprising engagement means, the shaft comprising engagement means of corresponding shape and dimension so that their mutual engagement allows securing in rotation the bushing and the shaft about the axis.
 the spring comprises a first section fastened on the bushing and a second section fastened on the output mesh.
 one of the input mesh and of the output mesh comprises at least one tooth, the other comprising at least one complementary housing, the tooth being configured to enter the housing in order to block the output mesh in rotation relative to the input mesh when the actuator moves the output mesh towards the input mesh.
 the input mesh is fixedly mounted on an inlet of a torque limiter, an outlet of said torque limiter being fixedly mounted on the casing.

the device comprises two motors each comprising a drive shaft movable in rotation about an associated axis, an electromagnet, an actuator, a casing, a coupling device and a fastening part being associated with each shaft.

the device further comprises a first and a second force sensor, fastened on the lever, and a control unit configured to determine signals for controlling movable portions of the aircraft based on the forces measured by the first and the second force sensor.

According to a second aspect, the invention proposes a pilot stick of an aircraft comprising a control lever linked to at least one motor comprising a drive shaft movable in rotation about an axis and a force application device as described above.

Optionally, the pilot stick further comprises at least one force sensor, mounted on the lever or on a unitary part of the lever so as to detect a force applied on the lever by a pilot, and means for transmitting a force provided by the force sensor to a control unit configured to determine signals for controlling movable portions of the aircraft based on the forces measured by the first and the second force sensor.

BRIEF DESCRIPTION OF THE DRAWINGS

Other characteristics, aims and advantages of the present invention will become more apparent upon reading the following detailed description and in relation to the appended drawings given by way of non-limiting examples and in which.

DETAILED DESCRIPTION OF ONE EMBODIMENT

Overall Architecture of the Piloting System

Figure 1:
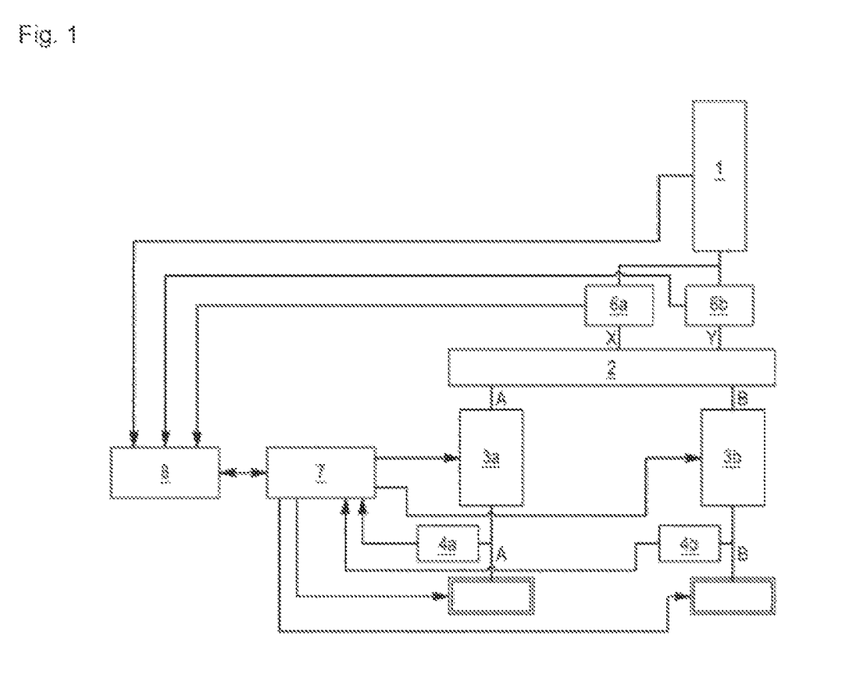
FIG. 1 schematically represents pilot stick architecture according to one embodiment of the invention.

FIG. 1 represents a functional architecture of the piloting system of an aircraft along its roll and pitch axes comprising in particular a pilot side-stick. The side-stick is typically found in the cockpit of the aircraft.

In this figure, the thickest lines between two functional units correspond to mechanical links. The other arrow links are electronic links through which data can flow.

The system comprises a control lever 1 rotatably mounted on a platen of a mechanical joint 2 along a roll axis X and a pitch axis Y of the lever, the two axes being orthogonal. The mechanical joint 2 is fastened to a frame secured to the floor of the cockpit of the aircraft.

Position sensors, preferably a sensor 4a associated with the roll axis and a sensor 4b associated with the pitch axis, communicate electronic signals of rotary position of the lever 1 respectively along the axes X and Y to a computer 7. The computer 7 pilots the force application device to achieve a predetermined force law. The computer 7 comprises an electronic interface for receiving said position signals. Optionally, the sensors 4a and 4b also communicate information on the rotational speed of the lever 1 along these axes. The information on the position/speed of the lever is translated into control signals for piloting movable portions of the aircraft by a flight control unit 8, or FCS (Flight Control System).

As will be described below, the control unit 8 is also configured to determine, based on the lever position/speed information and possibly other information, commands to apply a force on the lever 1. The computer 7 determines, based on the force application commands, signals for controlling the force application device associated with the side-stick.

In the present example, the force application device comprises an electric motor 3a associated with a shaft 13 of axis A linked to the roll axis X of the lever. By "linked to the axis" is meant that a link mechanism exists between the shaft of axis A and an element of the joint 2 set in motion when the lever pivots along the axis X. Likewise, the device comprises an electric motor 3b associated with a shaft of axis B linked to the pitch axis Y of the lever.

Alternatively, the motor 3a could be arranged to act directly on the axis X via a rotating shaft linked to the joint 2 and the motor 3b could be arranged to act directly on the axis Y via a rotating shaft linked to the joint 2.

The piloting system also comprises force sensors 6a and 6b measuring respectively the torque exerted on the lever pivotally along the axis X and along the axis Y. These are for example strain gauges, typically of the capacitive or piezoelectric type. The force sensors 6a, 6b can be fastened on the lever 1 or on any part secured in motion to the lever 1 likely to receive the forces applied by a pilot on the stick.

Such sensors are in particular useful if the piloting system comprises a force-pilot mode, in which the lever is immobilized and the control unit 8 determines signals for controlling the movable portions of the aircraft based on the forces applied on the lever 1.

Figure 2:
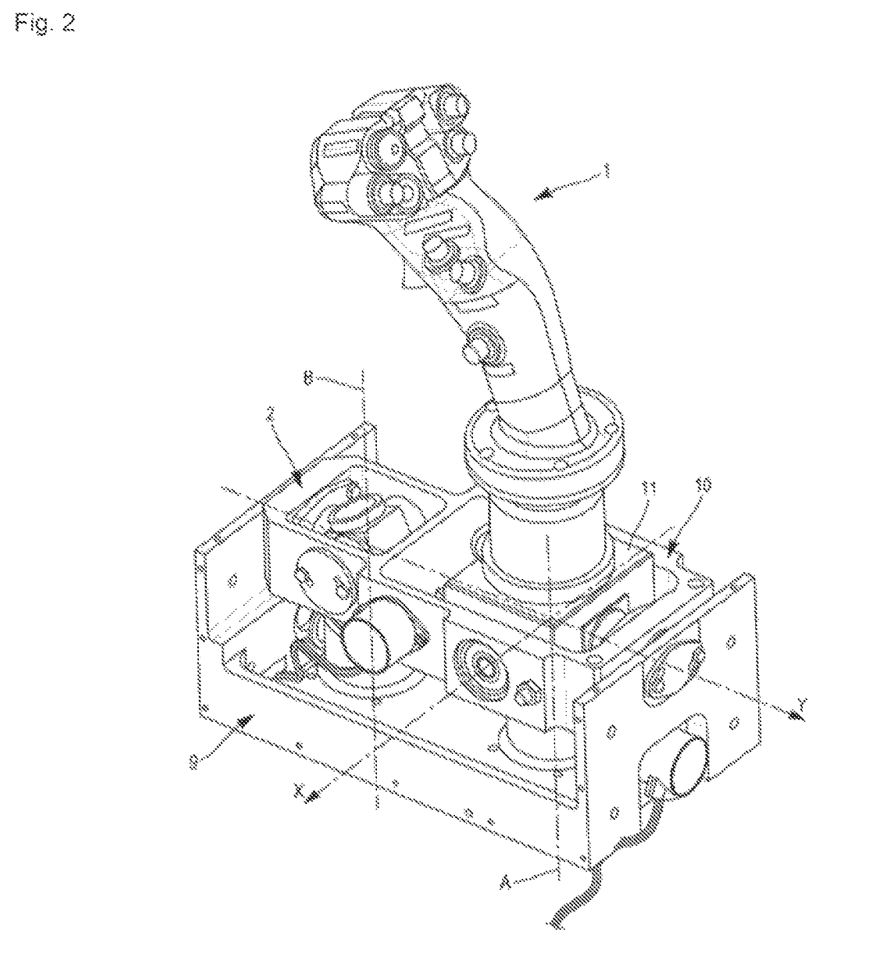
FIG. 2 is a perspective view of a lever and of a mechanical joint of one exemplary embodiment of a side-stick.

FIG. 2 represents an exemplary embodiment. The lever 1 is arranged on a mechanical joint 2 fastened to a frame 9 secured to a chassis of the aircraft. The motors 3a and 3b (not visible) are offset from the lever.

The lever 1 is free at one end and fastened to a first platen 11 at the other end. The first platen 11 is movable in rotation along the axis X and along the axis Y and is linked to a second platen 10 of the joint 2. The axis X is linked to the first platen 11 so that a pivoting of the first platen 11 about the axis Y pivots the axis X about the axis Y.

Two transmissions, each comprising a universal joint, translate a rotational motion of the lever along the axis X, respectively along the axis Y, into a rotational motion of a shaft (not represented) extending along the axis A, respectively along the axis B.

The motors 3a and 3b are thus in direct engagement on the mechanical joint 2 and can transmit a resistive or motor force in response to the pivotal motions of the lever 1 by the pilot, according to a force law or a predetermined damping law.

For more details on the structure of the joint 2 and on the mechanical link with the motors 3a and 3b, reference may be made to FIG. 1 of document FR 3 011 815 and to the description relating thereto.

Mechanical Force Application Device

Figure 3:
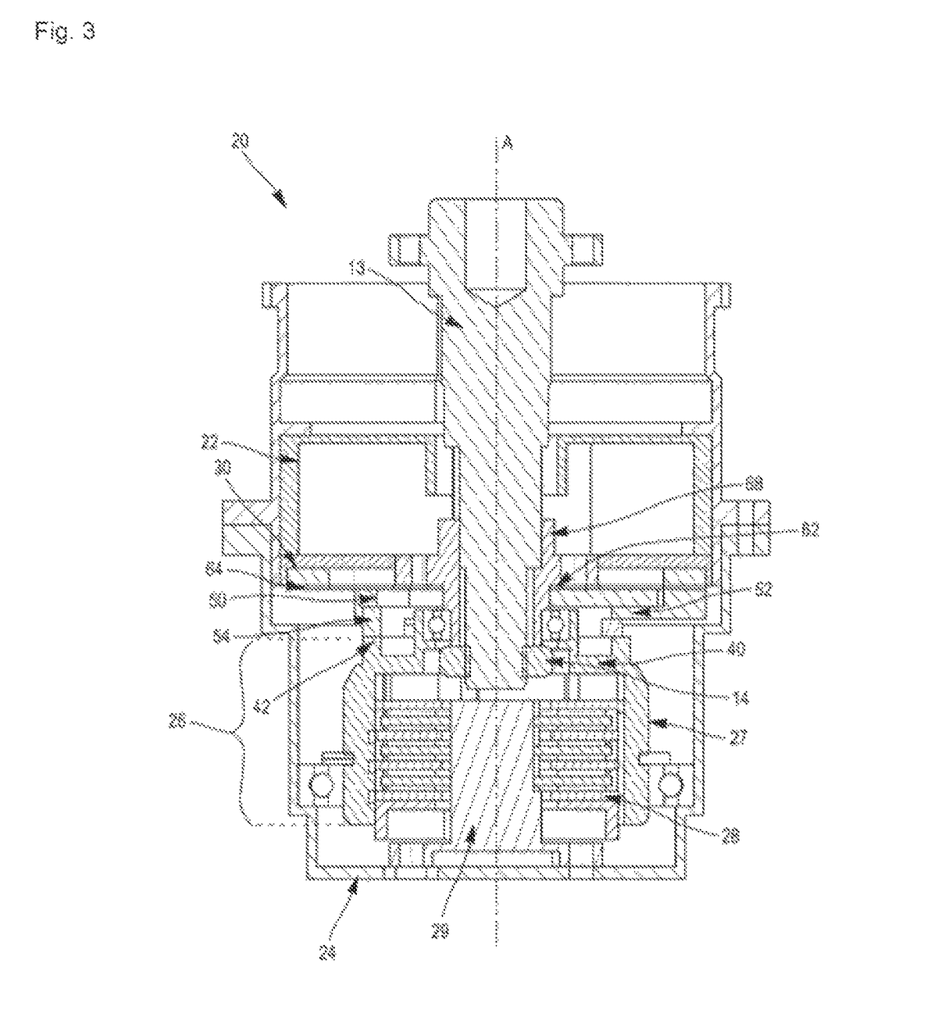
FIG. 3 is a sectional view of one exemplary embodiment of a force application device according to one embodiment of the invention.

The piloting system further comprises a mechanical backup channel configured to prevent the rotation of the lever from being completely free in the event of an electrical fault affecting a force feedback motor (FIG. 3). The mechanical backup channel comprises particularly a mechanical force application device 20 comprising:

a casing 24, configured to be fixed relative to the aircraft,
at least one electromagnet 22, mounted on the casing 24,
an actuator 30, mounted on the shaft 13, said actuator 30 being movable in translation relative to the shaft 13 along the axis A, the actuator 30 comprising a magnetic material so that the electric current supply of the electromagnet 22 moves the actuator 30, and
a coupling device 40, 50 comprising an input mesh 40 mounted fixed relative to the casing 24 and an output mesh 50 mounted on the actuator 30 by means of a fastening part 60, said fastening part 60 being configured so as to allow a limited angular displacement between the output mesh 50 and the shaft 13 about the axis A and to authorize the translation of the output mesh 50 and of the actuator 30 along the axis A.

In one embodiment, each motor of the piloting system comprises such a mechanical force application device 20, mounted on its shaft 13. A motor is therefore associated with a force application device 20.

For the sake of simplicity, only one of the piloting system application devices 20 will be described in more detail and illustrated below, the second force application device 20 being identical.

Electromagnet

The electromagnet 22 is supplied with electric current by the piloting system. Consequently, when the piloting system is active and operational, the electromagnet 22 transforms the electric current into a magnetic field. On the other hand, when the piloting system is turned off, or during an electrical failure, the electromagnet 22 does not produce a magnetic field.

The electromagnet 22 is fixedly mounted in translation on the shaft 13.

Actuator 30

Figure 4:
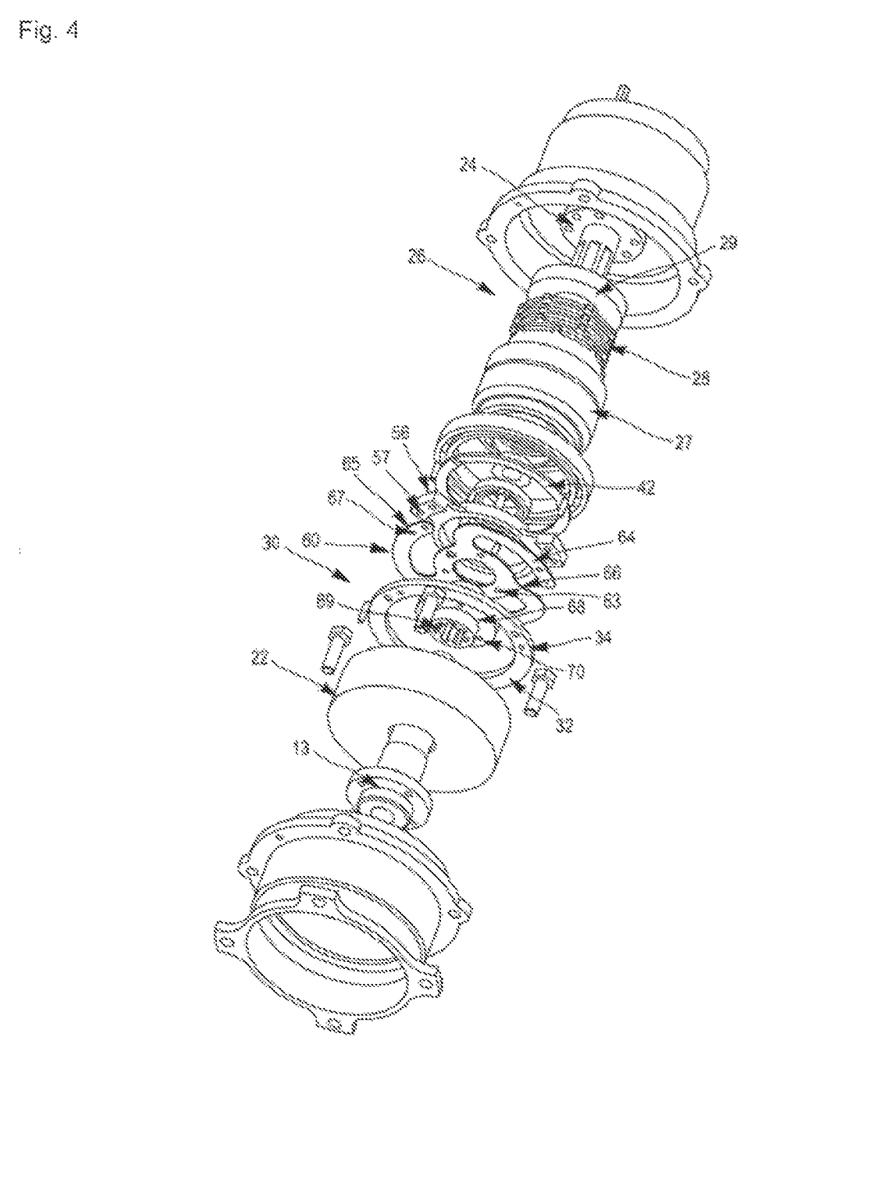
FIG. 4 is an exploded view of the exemplary embodiment of FIG. 3.

Since the actuator 30 is made of a magnetic material, it is moved by the electromagnet 22 when the piloting system is active and operational, under the effect of the magnetic field it produces. In the exemplary embodiment illustrated in the figures, in which the actuator 30 extends between the coupling 40, 50 device 20 and the electromagnet 22, the polarity of the material constituting the actuator 30 is chosen so that the movement induced by the electromagnet 22 is in a direction away from the electromagnet 22.

In a first embodiment, the actuator 30 can be entirely made from the magnetic material. As one variant, only part of the actuator 30 is made of such a material.

In one exemplary embodiment, the actuator 30 comprises an annular rim 32 made from the magnetic material. By magnetic material, it will be meant here a metal material reacting to the magnetic field generated by the electromagnet 22 so that the electric current supply moves the actuator 30. For example, the actuator 30 can be made of soft iron. A series of through orifices 34 are formed in the rim 32 of the actuator 30 in order to allow its fastening in particular on the fastening part 60, and optionally on the output mesh 50.

Output Mesh 50 of the Coupling Device 40, 50

The output mesh 50 may comprise an annular crown 52 made from a material strong enough to transmit coupling forces capable of blocking in rotation the shaft 13 of the motor. For example, the output mesh 50 can be made of 15-5 PH stainless steel.

The output mesh 50 is linked to the actuator 30 so that the movement of the actuator 30 induces a movement of the output mesh 50.

Furthermore, the output mesh 50 comprises securing means 54 configured to cooperate with securing means 42 complementary to the input mesh 40 in order to secure them in rotation when the actuator 30 moves the output mesh 50 towards the input mesh 40. The securing means 54 extend (or are formed) in the face of the annular crown 52 which is opposite the input mesh 40.

Fastening Part 60

The fastening part 60 may comprise a central ring 62 configured to allow its fastening on the shaft 13 and a radial portion 64 configured to be fastened on the actuator 30 and the output mesh 50.

In a first embodiment, the fastening part 60 then also comprises a bushing 68 in the inner face of which splines 69 can be formed, extending substantially parallel to the axis A of the shaft 13, of shape and dimension corresponding to associated grooves formed in the shaft 13, as well as a nut 14. The engagement of the splines 69 of the bushing 68 in the grooves of the shaft 13 and the nut 14 thus allow securing in rotation and in translation the bushing 68 and the shaft 13.

The central ring 62 is fixedly linked in translation and in rotation to the bushing 68. For example, a series of through holes 70, of shape and dimensions complementary to through holes 63 formed in the central ring 62 and placed are then formed in a collar of the bushing 68 in order to allow the fastening of the central ring 62 on the bushing 68 thanks to the insertion of fastening axes through the holes when they are placed oppositely.

In a second embodiment, the splines 68 (or the grooves, respectively) are formed directly in the inner face of the central ring 62, the central ring 62 then being directly fastened on the shaft 13 by matching its splines 68 (or its grooves, respectively) with the grooves (respectively the splines 68) of the shaft 13.

The radial portion 64 of the fastening part 60 comprises a substantially annular periphery 65 which is linked to the central ring 62 by means of a series of tabs 66 so as to make them secured to each other. The diameter of the central ring 62 is smaller than the diameter of the periphery 65 so that the ring lies within the periphery 65. In one embodiment, the periphery 65 is discontinuous and formed of several ring segments, each ring segment being connected to the central ring 62 by means of a tab 66. Each tab 66 may furthermore be curved, as illustrated in FIG. 4.

The assembly formed by the central ring 62, the periphery 65 and the tabs 66 then constitutes a spring having a torsional stiffness greater than its axial stiffness, in order to authorize an axial displacement of the output mesh 50 and of the actuator 30, but to limit their angular displacement about the axis A. Preferably, this spring (62, 65, 66) is fastened on the bushing 68 in a pre-stressed (or preloaded) state such that when the electromagnet 22 is not supplied, the spring exerts a return force on the actuator 30 and on the output mesh 50 in the direction of the input mesh 40.

For example, the fastening part 60 may comprise a flex plate, the central ring 62, the tabs 66 and the segmented periphery 65 then being made of a metal sheet. In this exemplary embodiment, the flex plate can be added onto and fastened on a bushing 68 as described above in order to allow its fastening on the shaft 13. For example, the flex plate can be made from a sheet of X10 CrNi18-8 having a thickness of 0.5 mm.

In one embodiment, the output mesh 50 is fastened on the radial portion 64, the actuator 30 being able to be fastened either on the central ring 62 or on the radial portion 64 as well. Preferably, when the fastening part 60 comprises a spring (62, 65, 66), the actuator 30 is fastened on the radial portion 64 so that the actuator 30 is returned, with the input mesh 40, towards the output mesh 50 in the absence of electric current supply to the electromagnet. For example, a series of through orifices 57 can be formed in the crown 52 of the output mesh 50 in order to allow its fastening on the periphery 65 of the radial portion 64. More specifically, the through orifices 57 of the output mesh 50 are configured to face through orifices 67 formed in the periphery 65 so as to allow the insertion of fastening rods and their securing. In one embodiment, the through orifices 57 may be formed in protrusions 56 protruding from the annular crown 52.

In the exemplary embodiment illustrated in the figures, the actuator 30 is also fastened on the radial portion 64.

For that, a series of through orifices may for example be in the annular rim 32, of shape and dimensions complementary to the through orifices of the annular crown 52 of the output mesh 50 and of the periphery 65 of the radial portion 64 in order to allow their matching and their mutual fastening by the series of fastening axes A.

Input Mesh of the Coupling 40, 50 Device 20

The input mesh 40 is mounted fixed relative to the casing 24 that is to say on a fixed part embedded on the aircraft.

For that, in a first exemplary embodiment, the input mesh 40 can be mounted directly on the casing 24.

As a variant, the input mesh 40 can be mounted on a torque limiter 26 which is itself mounted on the casing 24. A torque limiter 26 comprises, in a manner known per se, an inlet 27, an outlet 29 and a coupling area 28 connecting the inlet 27 and the outlet 29. The coupling area 28 is dimensioned according to a maximum permissible torque. Like a fuse, when the torque applied to the inlet 27 of the torque limiter 26 remains lower than the maximum permissible torque (the outlet 29 being mounted fixed on the casing 24 and therefore not being biased in torsion), the coupling area 28 directly transmits the torque from the inlet 27 to the outlet 29 of the limiter 26. On the other hand, when this torque exceeds this maximum permissible torque, the coupling area 28 slips and authorizes the rotation. In other words, no relative motion of the inlet 27 relative to the outlet 29 is possible, so that when a torque lower than the maximum permissible torque is applied on the inlet 27 of the torque limiter 26 (corresponding to a certain force applied on the lever 1), no motion of the inlet 27 is possible. As a result, the shaft 13 and the lever 1 are therefore blocked in motion. As will be seen below, the fastening of the input mesh 40 on the casing 24 by means of a torque limiter 26 allows protecting the piloting system for cases of limit torque exceeding that of the seizure case.

The securing means 54, 42 of the input mesh 40 and of the output mesh 50 can form a dog clutch. For example, one of the input mesh 40 and of the output mesh 50 may comprise at least one tooth, preferably several teeth, while the other of the output mesh 50 and of the input mesh 40 comprises at least as many housings of complementary shape and dimensions. In the illustrated exemplary embodiment, the dog clutch comprises three teeth 54 and three complementary housings 42.

The insertion of the teeth 54 in the housings 42 then allows securing in rotation the input mesh 40 and the output mesh 50, and therefore engaging the casing 24 (or alternatively the inlet 27 of the torque limiter 26) with the shaft 13 by means of the fastening part 60.

Operation of the Mechanical Force Application Device 20

The mechanical force application device 20 then operates as follows.

In normal operation of the piloting system, that is to say in the absence of an electrical or mechanical fault at one of the motors or of a failure in the chain for processing the motor control signals, the electromagnet 22 is supplied with electric current and produces a magnetic field exerting a return force of the actuator 30 towards the electromagnet 22 greater than the pre-stress applied by the fastening part 60. The actuator 30 is then moved under the effect of the magnetic field until reaching a first equilibrium position. Typically, in the exemplary embodiment illustrated in the figures, the actuator 30 is attracted by the electromagnet 22 and moves upwards. However, it will be noted that a clearance remains between the actuator 30 and the electromagnet 22, a contact that may generate a friction torque during the movement of the lever 1 (the actuator 30 being secured in rotation to the shaft 13 while the electromagnet 22 is fixed in rotation). Where appropriate, the device 20 may further comprise an abutment against which the actuator 30 is configured to come into contact when the electromagnet is supplied.

The output mesh 50 being secured in translation to the actuator 30 thanks to the fastening part 60, the latter also moves upwards until reaching a rest position. In this rest position, the output mesh 50 and the input mesh 40 are disengaged.

The actuator 30, the fastening part 60 and the output mesh 50 are therefore movable in rotation with the shaft 13 (through their fastening thanks to the engagement of the splines 68 in the grooves).

The shaft 13 is therefore free in rotation, as none of the elements of the force application device 20 blocks its rotation.

In the event of a failure in the piloting system, and particularly in the event of an electrical or mechanical fault at one of the motors or of a failure in the chain for processing the motor control signals, the electromagnet 22 is no longer supplied with electric current and therefore no longer produces a magnetic field. As the actuator 30 is no longer biased by the magnetic field, it is then moved in the opposite direction under the effect of the pre-stress applied by the fastening piece 60, until it reaches a second equilibrium position, different from the first equilibrium position. Typically, in the exemplary embodiment illustrated in the figures, the actuator 30 is no longer attracted by the electromagnet 22 and moves downwards.

As the output mesh 50 is secured in translation to the actuator 30 thanks to the fastening part 60, this actuator also moves downwards until it comes into contact with the input mesh 40.

The fastening part 60 then allows the insertion of the teeth 54 of one into the housings 42 of the other in the event of misalignment.

The dog clutching of the input mesh 40 and of the output mesh 50 then allows coupling the casing 24 (when appropriate by means of the torque limiter 26) and the shaft 13 of the motor.

In this position, the output mesh 50 is therefore substantially fixed angularly, since it is coupled to the input mesh 40 which is mounted fixed relative to the casing 24. Consequently, the fastening part 60, on which the output mesh 50 is mounted, is also fixed in rotation. However, this fastening part 60 is itself fixedly mounted on the shaft 13, thanks to the matching of the splines 68 and the grooves. As a result, the shaft 13 of the motor is immobilized in rotation.

Consequently, the piloting system is devoid of active force feedback device 20, the shafts 13s of its two motors being immobilized (the failure of the piloting system impacting the two motors and the two associated force application devices 20s).

During the failure of the piloting system, the lever is then immobilized in its last position, even if it was not in neutral position, since the shafts 13s of the motors are immobilized.

The force application device 20 therefore forms a mechanical backup channel that prevents the rotation of the lever in the event of an electrical fault affecting the associated motor.

In addition, the lever cannot switch into a mode where the pilot can freely pivot the lever without feeling a resistive force. On the contrary, the lever remains fixed in rotation and the aircraft is force-piloted, thanks to the force sensors 6a, 6b. More specifically, as the lever is blocked and is no longer able to pivot along the axes As X and Y, the forces applied by the pilot on the lever are measured by the force sensors 6a, 6b. The measurements provided by these force sensors 6a, 6b are then transmitted to the control unit, which is configured to determine signals for controlling the movable portions of the aircraft based on the forces measured by these force sensors 6a, 6b and thus allow the aircraft to be piloted in degraded mode.

In the event of seizure of all or part of the mechanical chain of the handle, the force applied by the shaft 13 on the coupling device 40, 50 becomes very important.

In a manner known per se, the mechanical joint 2 consists of several parts and is configured to withstand several cases of loads of different values, typically a first load case called "seizure" load and a second load case called "abutment" load. The abutment load case being more important than the seizure load case. The biased parts for each of these load cases are not identical. In other words, in the mechanical joint 2, some parts are dimensioned to withstand the seizure load case and other parts are dimensioned for the abutment load case.

However, when the coupling 40, 50 device 20 is dog clutched, that is to say the securing means 54 of the input 40 and output mesh are engaged and the lever 2 is blocked in position, the parts dimensioned for the seizure case are likely to be exposed to the abutment load case.

When the coupling 40, 50 device 20 is directly connected to the casing 24, it is therefore necessary to re-dimension these parts upwards so that they are capable of withstanding the forces without being damaged regardless of the load case, which may affect the space requirement of the mechanical joint 2 and of the piloting system more generally.

As a variant, when the coupling 40, 50 device 20 is fastened on the inlet 27 of a torque limiter 26 and the torque applied to this inlet exceeds the maximum torque permissible by this torque limiter 26 (set to have a slip above a torque equivalent to the case of seizure load), the coupling area 28 slips and then authorizes the rotation of the shaft 13, which allows handing over to the parts specifically dimensioned for the abutment load case and therefore avoids over-dimensioning the parts designed for the seizure load case.

The invention claimed is:

1. A force application device for a pilot stick of an aircraft, the force application device comprising:
 a casing, configured to be fixed relative to the aircraft;
 an electromagnet, mounted on the casing;
 an actuator mounted on a first shaft of a first motor, the first shaft being movable in rotation about a first axis, said actuator being movable in translation relative to the first shaft along the first axis, the actuator comprising a magnetic material; and
 a coupling device comprising an input mesh fixedly mounted with respect to the casing and an output mesh linked to the actuator through a fastening part, said fastening part being configured so as to allow a limited angular displacement between the output mesh and the first shaft about the first axis and to allow translation of the actuator and the output mesh along the first axis.

2. The force application device according to claim 1, wherein the fastening part comprises a spring having a torsional stiffness and an axial stiffness, the torsional stiffness being greater than the axial stiffness.

3. The force application device according to claim 2, wherein the torsional stiffness is at least three times greater than the axial stiffness.

4. The force application device according to claim 2, wherein the fastening part comprises a flex plate.

5. The force application device according to claim 2, wherein the fastening part is pre-stressed and applies a force on the actuator and on the output mesh, so that when the electromagnet is not supplied, the fastening part applies a return force on the actuator and on the output mesh towards the input mesh.

6. The force application device according to claim 2, wherein the fastening part further comprises a bushing comprising splines, the first shaft comprising grooves so that mutual engagement between the splines and the grooves allow for simultaneous rotation of the bushing and the first shaft about the first axis.

7. The force application device according to claim 6, wherein the spring comprises a first section fastened on the bushing and a second section fastened on the output mesh.

8. The force application device according to claim 1, wherein one of the input mesh and of the output mesh comprises at least one tooth, the other one of the input mesh and of the output mesh comprising at least one housing, the at least one tooth being configured to enter the at least one housing in order to block the output mesh in rotation with respect to the input mesh when the actuator moves the output mesh towards the input mesh.

9. The force application device according to claim 1, wherein the input mesh is fixedly mounted on an inlet of a torque limiter, an outlet of said torque limiter being fixedly mounted on the casing.

10. The force application device according to claim 1, further comprising:
 a first force sensor and a second force sensor, fastened on a control lever of the pilot stick; and
 a control unit configured to determine signals for controlling movable portions of the aircraft based on the forces measured by the first force sensor and the second force sensor.

11. A pilot stick of an aircraft comprising:
 the force application device according to claim 1; and
 a control lever linked to the first motor comprising the first shaft movable in rotation about the first axis.

12. The pilot stick according to claim 11, further comprising at least one force sensor, mounted on the control lever or on a unitary part of the control lever so as to detect a force applied on the control lever by a pilot, and a control unit configured to determine signals for controlling movable portions of the aircraft based on the forces measured by the at least one force sensor.

13. The pilot stick according to claim 11,
wherein the force application device is a first force application device,
wherein the pilot stick further comprises a second force application device comprising:
 a casing, configured to be fixed relative to the aircraft;
 an electromagnet, mounted on the casing of the second force application device;
 an actuator mounted on a second shaft of a second motor, the second shaft being movable in rotation about a second axis different from the first axis, said actuator being movable in translation relative to the second shaft along the second axis, the actuator comprising a magnetic material; and a coupling device comprising an input mesh fixedly mounted with respect to the casing of the second force application device and an output mesh linked to the actuator of the second force application device through a fastening part, said fastening part being configured so as to allow a limited angular displacement between the output mesh of the second force application device and the second shaft about the second axis and to allow translation of the actuator of the second force application device and the output mesh of the second force application device along the second axis, and wherein the control lever is linked to the second motor comprising the second shaft movable in rotation about the second axis.

* * * * *